B. R. BENJAMIN.
MOWER OILING SYSTEM.
APPLICATION FILED JAN. 17, 1916.

1,230,841.

Patented June 26, 1917.

Inventor
Bert R. Benjamin.
By
Chas. E. Lord
Atty.

UNITED STATES PATENT OFFICE.

BERT R. BENJAMIN, OF OAK PARK, ILLINOIS, ASSIGNOR TO INTERNATIONAL HARVESTER COMPANY OF NEW JERSEY, A CORPORATION OF NEW JERSEY.

MOWER-OILING SYSTEM.

1,230,841. Specification of Letters Patent. Patented June 26, 1917.

Application filed January 17, 1916. Serial No. 72,510.

*To all whom it may concern:*

Be it known that I, BERT R. BENJAMIN, a citizen of the United States, residing at Oak Park, in the county of Cook and State of Illinois, have invented certain new and useful Improvements in Mower - Oiling Systems, of which the following is a full, clear, and exact specification.

My invention relates to mower oiling systems.

It has for its object to enable the oil to be applied to the crank shaft bearings of a mower in an improved manner so that even in the hands of the most ignorant or careless operators, these bearings will be properly oiled. A further object is to enable the oil to be applied to these crank bearings with increased facility and to provide means whereby both these bearings and the pitman bearing may be lubricated at the same time and with greater economy. I attain these objects by an improved construction, wherein the oil is applied to the crank shaft bearings from a point exterior to the gear casing, is directed along the crank shaft through its bearings, and out to the bearings of the pitman.

In the accompanying drawings I have, for purposes of illustration, shown one embodiment which my invention may assume in practice.

Figure 1:
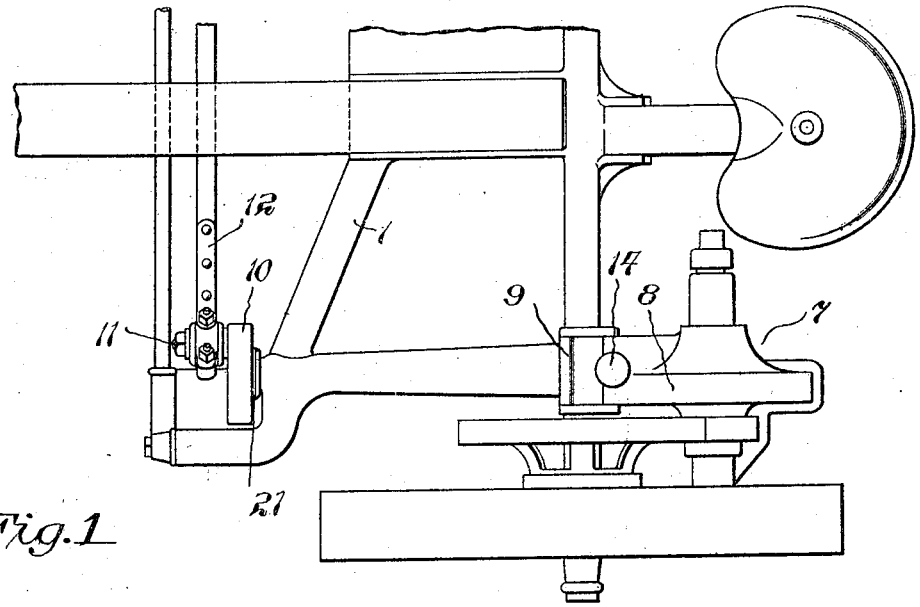
Figure 1 is a partial plan view of a mower equipped with my improvement.
Figure 2:
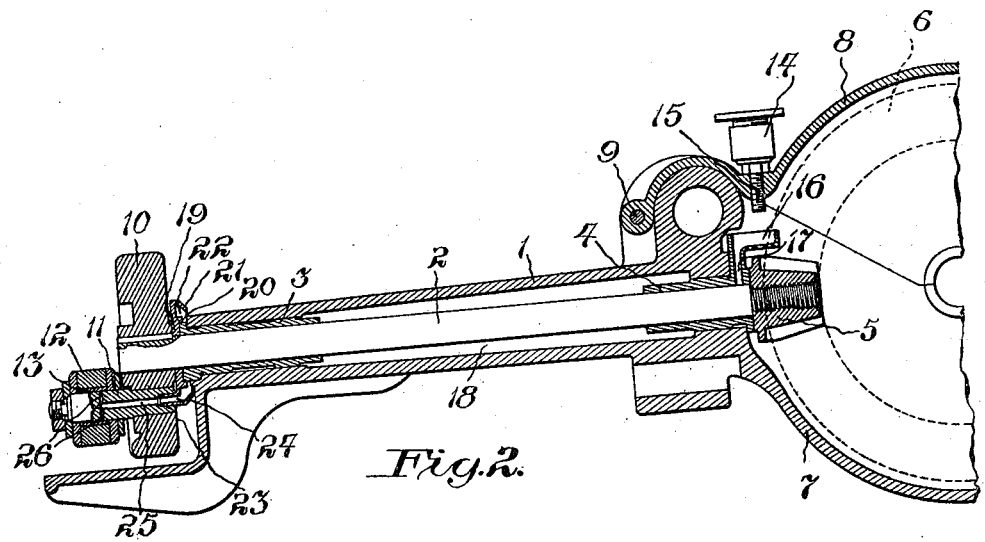
Fig. 2 is a longitudinal sectional view showing the parts of the oiling system.

The mower shown is of standard construction, comprising a frame 1 having a longitudinally disposed crank shaft 2 journaled therein in front and rear fixed bearings 3 and 4, respectively. As shown, this shaft is provided with a bevel gear 5 on its rear end meshing with the driving gear 6 of the mower, which is inclosed in the usual gear casing 7 having a removable cover 8 pivoted thereto at 9. Upon the opposite end of this crank shaft 2 is carried the pitman crank or disk 10, carrying a crank pin 11, upon which a pitman 12 is mounted in bearings 13.

In my improved construction the oil is supplied to the bearings 4, 3 and 13 in a continuous circuit from the outside of the gear casing 7. As shown, an oil cup 14 is threaded into the cover 8 of the gear casing, this cup being provided for the purpose with a threaded tubular end 15 extending well inside the cover. The oil drips from this cup into a receiving disk or cup 16, which is preferably formed integral with the bearing member 4 and disposed at a point between the bevel gear 5 and the end of the frame portion 1, in which the shaft is carried. The disk or cup 16, if preferred, may be so arranged as to receive a supply of oil from the action of the gears 5 and 6 running in an oil bath. From this cup 16 the oil passes downward through a duct 17 to the surface of the shaft and is fed along this shaft through the usual chamber 18 surrounding the same to the other bearing 3, passing between the shaft and the bearing in a well-known manner until it engages with a radially extending member 19 fixed to the crank disk 10 and rotatably mounted on the shaft at a point between the disk 10 and the front end of the bearing. As shown, this member is provided with an inner annular flange 20 extending around the end of the bearing and an outer beveled or inclined annular flange 21 in such a manner as to form an intermediate annular groove 22; this member also being provided with a lower longitudinally disposed outlet portion 23 which fits into a recess in the crank pin 11 and is provided with a bore 24 which communicates with the groove 22 and with a longitudinally extending duct 25 in the crank pin, which, in turn, communicates with oppositely disposed laterally extending ducts 26 which supply the oil to the bearing surface of the pitman bearing 13.

In my improved construction it is obvious that even the most ignorant operator has no difficulty in finding the necessary oil hole for the crank shaft bearings, the oil cup 14 being in plain sight and readily accessible on the gear casing even without opening the latter. Further, it is obvious that the operator in a single operation is enabled to oil both of the crank shaft bearings and also the pitman bearing, thereby reducing the amount of trouble involved in oiling the machine and insuring the proper lubrication thereof, at the same time that the same flow of oil which is supplied to one set of bearing surfaces is later supplied to the other, thus reducing the amount of oil normally wasted.

While I have in this application specifically described one embodiment which my invention may assume in practice, it is to be understood that this embodiment is shown for purposes of illustration, and that the invention may be modified to assume other forms without departing from its spirit, it being my intention to include all such modifications within the scope of the appended claims.

What I claim as new is:

1. In combination, a frame, a shaft thereon, a bearing for said shaft, gearing connected to one end of said shaft, a gear casing inclosing said gearing and having an oil inlet therein, and means integral with said bearing receiving oil from said inlet and delivering the same to said bearing.

2. In combination, a frame, a shaft carried thereon, a bearing member for said shaft, gearing connected to said shaft, a gear casing carried on said frame, a gear casing cover, an oil cup threaded in said cover, and a coöperating cup receiving oil from said first mentioned cup and delivering the same to said shaft bearing.

3. In combination, a mower frame, a solid crank shaft journaled thereon, a crank on said shaft, a crank pin on said crank, a pitman journaled on said crank pin, and means for supplying oil to the bearing surfaces of said pitman from the rear end of said shaft.

4. In combination, a mower frame, a crank shaft journaled thereon, a crank on said shaft, a crank pin on said crank, a pitman journaled on said crank pin, and means including a casing inclosing said shaft for supplying oil to the bearing surfaces of said pitman and crank shaft from the rear end of said shaft.

5. In combination, a frame, a shaft thereon, a bearing for said shaft, a crank on said shaft, a crank pin on said crank, a pitman journaled on said pin, and means including a casing inclosing said shaft for supplying lubricant from a single point to the bearing surfaces of said shaft and pitman.

6. In combination, a frame, a solid shaft thereon, a bearing for said shaft, a crank on said shaft, a crank pin on said crank, a pitman journaled on said pin, and means for supplying lubricant successively to the bearing surfaces of said shaft and pitman.

7. In combination, a frame, a solid shaft thereon, a bearing for said shaft, a longitudinally and laterally bored crank pin carried on said shaft, a pitman journaled on said pin, and means for feeding oil supplied to said shaft bearing through said bearing to the bore in said crank pin.

8. In combination, a frame, a shaft thereon, a bearing for said shaft, a crank pin carried on said shaft, a pitman journaled on said crank pin, a lubricant collecting and delivering member disposed between said crank pin and bearing and rotatable with said pin, and means for supplying lubricant to said shaft and communicating with said rotatable member and the bearing surface of said pin.

9. In combination, a frame, a shaft thereon, a bearing for said shaft, a crank pin carried on said shaft, a pitman journaled on said crank pin, an annularly grooved member disposed between said crank pin and bearing and rotatable with said pin, said member having a portion seated in said pin, and means for lubricating said shaft and communicating with the groove in said member and the bearing surface of said pin for supplying lubricant through said bearing and said bearing surface.

10. In combination, a frame, a solid shaft thereon, a plurality of spaced bearings for said shaft, driving mechanism for said shaft, a casing for said mechanism, a crank on said shaft, a pitman pin on said crank, a pitman journaled on said pin, and means for supplying lubricant from the exterior of said casing to the bearing surfaces of both said shaft and pitman.

11. In combination, a frame, a shaft thereon, a bearing for said shaft, gearing connected to one end of said shaft, a gear casing inclosing said gearing, an oil cup carried on said casing, an oil cup receiving oil from said inlet and delivering the same to said shaft bearing, a crank carried on the opposite end of said shaft, a crank pin on said crank, a pitman journaled on said pin, and means communicating with said last mentioned oil cup and the bearing surface of said pin.

12. In combination, a tubular frame member, a plurality of spaced bearings fixed in the opposite ends thereof, a crank shaft journaled in said bearings, a gear on one end of said shaft, a driving gear carried on said frame meshing with said first mentioned gear, a gear cover connected to said frame having an oil inlet therein, an oil cup receiving oil from said inlet and delivering the same successively to the bearings for said shaft, a crank disk carried on the opposite end of said shaft, an oil collecting and delivering member rotatable with said disk, a crank pin carried on said disk, a pitman journaled on said pin, and oil delivering means communicating with said rotatable member and the bearing surface of said pitman delivering oil to the latter.

In testimony whereof I affix my signature.

BERT R. BENJAMIN.